United States Patent [19]

Nakayama

[11] Patent Number: 4,984,911

[45] Date of Patent: Jan. 15, 1991

[54] INK DOT PRINTER

[75] Inventor: Tetsuro Nakayama, Shizuoka, Japan

[73] Assignee: Tokyo Electric Company, Ltd., Tokyo, Japan

[21] Appl. No.: 163,201

[22] Filed: Feb. 26, 1988

Related U.S. Application Data

[63] Continuation of Ser. No. 829,515, Feb. 14, 1986, abandoned.

[30] Foreign Application Priority Data

Feb. 28, 1985 [JP] Japan ............................ 60-39605

[51] Int. Cl.[5] ...................... B41J 3/12; G01D 15/16

[52] U.S. Cl. ................................ 400/124; 400/470; 346/140 R

[58] Field of Search ............ 400/120, 420, 471, 471.1, 400/126, 124; 346/75, 140 A, 140 PD, 140 R; 101/170

[56] References Cited

U.S. PATENT DOCUMENTS

| | | | |
|---|---|---|---|
| 3,884,684 | 5/1975 | Ohru et al. | 101/170 X |
| 4,404,573 | 9/1983 | Kocot et al. | 346/75 X |
| 4,552,469 | 11/1985 | Tsuge et al. | 400/124 X |
| 4,571,597 | 2/1986 | Kocot | 346/75 |
| 4,599,629 | 7/1986 | Tsuge et al. | 400/124 X |
| 4,603,338 | 7/1986 | Nakayama et al. | 400/124 X |

FOREIGN PATENT DOCUMENTS

| | | |
|---|---|---|
| 0042293 | 12/1981 | European Pat. Off. . |
| 3417948 | 11/1984 | Fed. Rep. of Germany . |

*Primary Examiner*—Clifford D. Crowder
*Attorney, Agent, or Firm*—Oblon, Spivak, McClelland, Maier & Neustadt

[57] ABSTRACT

A print head having a plurality of printing elements is disposed in an opposing relationship to an opposing electrode, and a negative voltage is applied to the opposing electrode while the print head is grounded. As a result, appearance of a spark discharge can be prevented, thereby preventing damage to the printing elements an extraordinary scattering of ink while improving the safety of and assuring stabilized printing by the device.

6 Claims, 4 Drawing Sheets

FIG. 4 (A)
FIG. 4 (B)
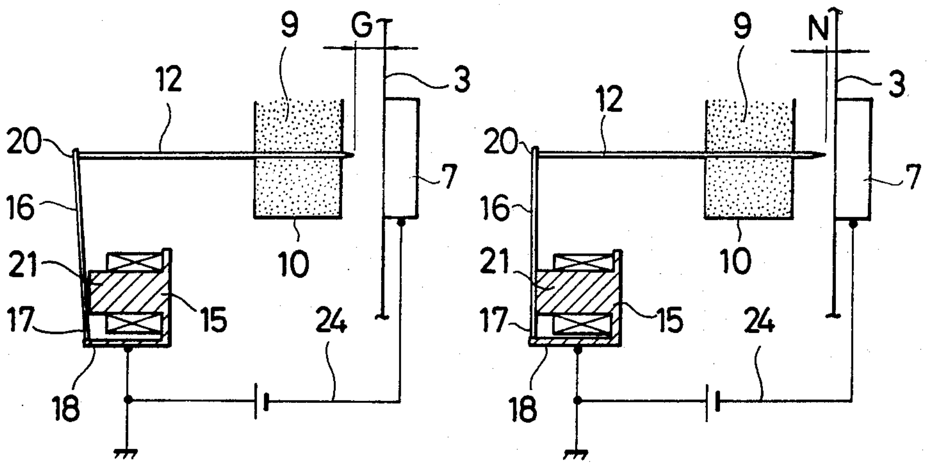
FIG. 5(A)
FIG. 5(B)
FIG. 5(C)
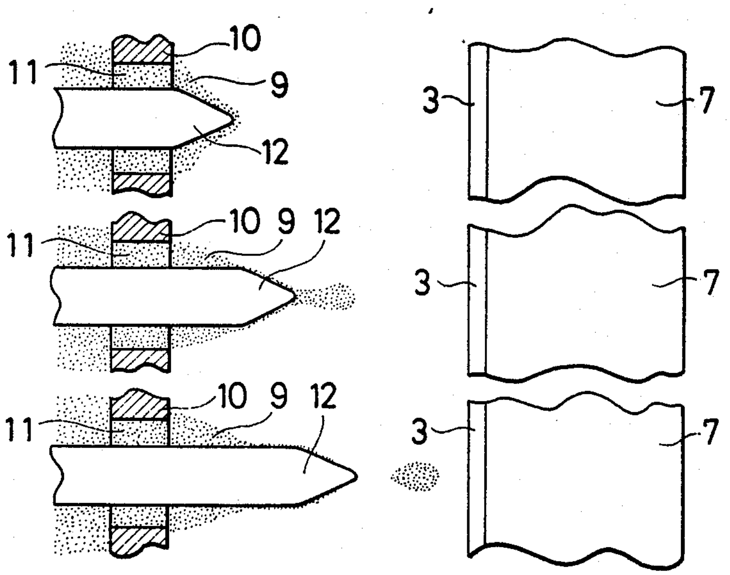

INK DOT PRINTER

This application is a continuation of application Ser. No. 06/829,515, filed on Feb. 14, 1986, now abandoned.

FIELD OF THE INVENTION AND RELATED ART STATEMENT

This invention relates to an ink dot printer which flies ink for printing.

In recent years, in order to eliminate a problem of producing noises upon impact which is a drawback of a dot printer of the impact type, research and development have been conducted toward ink dot printers which can effect printing without impact of a needle upon record paper.

One of such impact printers includes a needle as a printing element and makes use of a Coulomb's force to cause ink supplied to an end of the needle to fly to record paper to effect printing. In particular, ink is supplied to an end of a printing element, and an electrode is disposed in an opposing relationship to the end of the printing element with a record paper interposed therebetween. A potential sufficient to cause the supplied ink to fly is applied between the printing element and the electrode so that the ink may be flown in the form of a particle by a Coulomb's force produced therebetween. Accordingly, this arrangement is advantageous in that it produces no noises because the printing element do not contact with the record paper during printing.

In a printing device of the type, a potential difference between the printing element and the electrode must be great in order to cause ink supplied to the printing element to fly effectively. As a result, a high potential is applied between the printing element and the electrode. However, this will lead to a drawback that a spark discharge may appear as a result of a change of the atmosphere between the printing element and the electrode. Such a spark discharge will cause troubles such as a damage to the printing element or extraordinary scattering of ink.

OBJECT AND SUMMARY OF THE INVENTION

It is an object of the present invention to provide an ink dot printer which can assure stabilized printing with high safety without causing a spark discharge.

According to the invention, an ink dot printer comprises a print head including a plurality of printing elements having ends to which ink is adhered, and an opposing electrode disposed in an opposing relationship to the ends of the printing elements with record paper interposed therebetween, whereby a negative voltage is applied to the opposing electrode while the print head is grounded to provide between the opposing electrode and the printing elements a potential difference sufficient to cause the ink to fly toward the opposing electrode.

Due to a potential difference appearing between the printing elements and the opposing electrode, ink around the ends of the printing element is acted upon by a Coulomb's force to attract the ink toward the opposing electrode. By the Coulomb's force, the ink is caused to fly in the form of a particle toward the record paper in front of the opposing electrode.

Meanwhile, since the opposing electrode serves as a negative electrode, a critical point causing a spark discharge is raised. This is because where there is a potential difference between two bodies, spark discharging will appear less readily as a negative electrode becomes more flat. Accordingly, even if a change of the atmosphere appears between the printing elements and the opposing electrode, the requirements for appearance of a spark discharge are not met as yet, and hence the safety of the device and the stability of printing conditions are assured.

BRIEF DESCRIPTION OF THE DRAWINGS

FIGS. 4(*a*) and 4(*b*) are vertical sectional side elevational views illustrating, in diagrammatic representation, different operating conditions of a printing element; and FIGS. 5(*a*), 5(*b*) and 5(*c*) are enlarged vertical sectional side elevational views of an end of a printing element illustrating, in diagrammatic representation, different flying stages of ink for printing.

DETAILED DESCRIPTION OF THE PREFERRED EMBODIMENT

Figure 1:
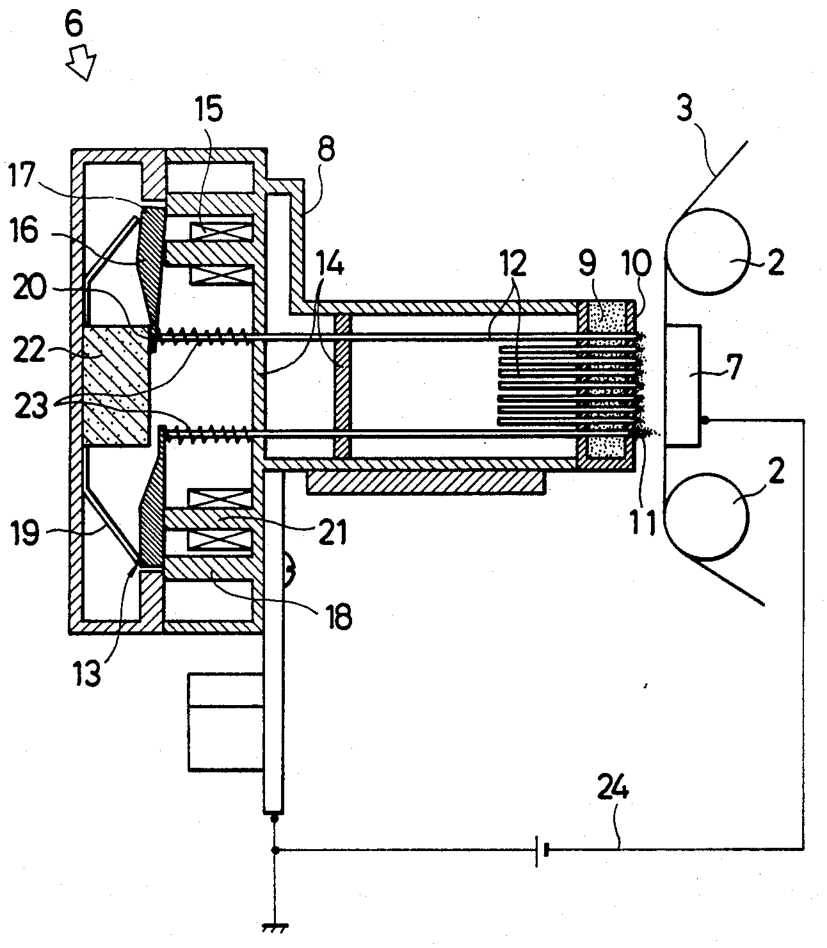
FIG. 1 is a vertical sectional view illustrating a printing head and an opposing electrode of an ink dot printer according to an embodiment of the present invention.
Figure 2:
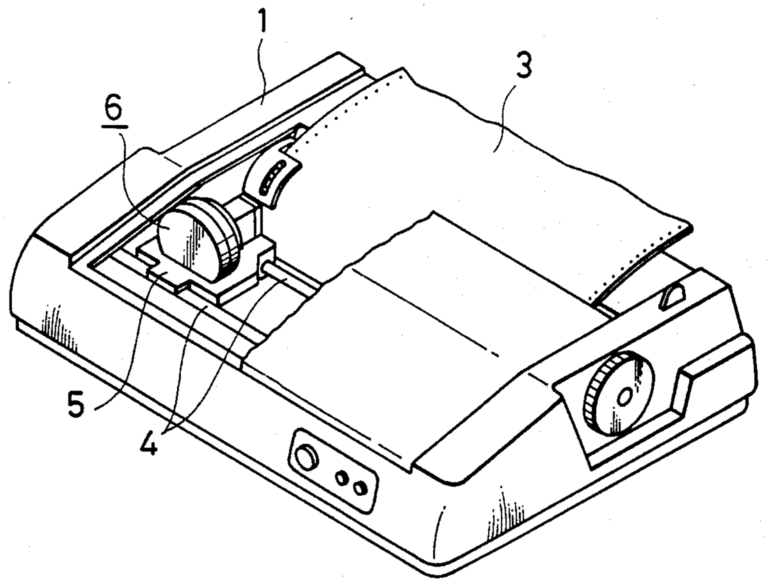
FIG. 2 is a perspective view of the entire ink dot printer of FIG. 1.
Figure 3:
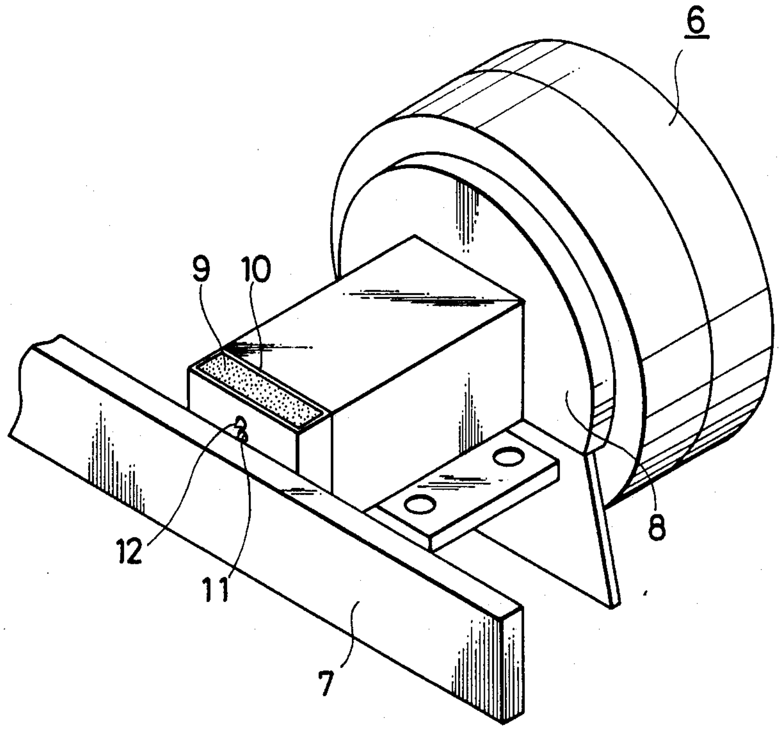
FIG. 3 is a perspective view of the printing head and the opposing electrode of FIG. 1.

A preferred embodiment of the present invention will now be described in detail with a reference to FIGS. 1 to 5(*a*), 5(*b*) and 5(*c*). A pair of paper feed rollers 2 are provided at predetermined individual positions within a casing 1 in the form of a cabinet. Record paper 3 is supported for transportation between the paper feed rollers 2. A pair of shafts 4 extend in parallel with the record paper 3, and a carrier 5 is mounted for sliding movement on the shafts 4. A print head 6 is secured to the carrier 5 and positioned such that an end thereof is opposed to the record paper 3. An opposing electrode 7 in the form of a band is located in an opposing relationship to the printing head 6 with the record paper 3 interposed therebetween and extends over the entire range of movement of the print head 6.

The print head 6 includes a head case 8 in the form of a cabinet, and an ink tank 10 which contains ink 9 therein is mounted at an end of the head case 8. The ink tank 10 has a plurality of fitting holes 11 formed in a column therein. A plurality of printing elements 12 are located in the head case 8 and have their ends extended through the fitting holes 11 in the ink tank 10. A driving device 13 for selectively driving the printing elements 12 is also provided in the head case 8.

Each of the printing elements 12 is in the form of a needle which is tapered at a forward end thereof. The tapered ends of the printing element 12 extend through the fitting holes 11 in the ink tank 10 while opposite ends thereof are secured to the driving device 13 with intermediate portions thereof guided by a pair of guide plates 14 to position the printing element 12. The printing elements 12 are thus positioned to have the tapered ends thereof opposed to the opposing electrode 7 with a predetermined gap G left therebetween.

The driving device 13 has a mechanism to push or pull the rear ends of the printing elements 12 to reciprocate the printing elements 12. In particular, the driving device 13 includes a plurality of magnetic coils 15 disposed along an annular line, and a plurality of armatures 16 disposed to be attracted and pivoted by the magnetic coils 15. The armatures 16 are positioned with one support ends thereof held between a yoke 18 of the magnetic coils 15 and spring plates 19 while the rear ends of the printing elements 12 are secured to opposite movable ends 20 of the armatures 16. Pivotal motion of each of the armatures 16 is limited within a range defined by a core 21 of the corresponding magnetic coil 15 and a stopper 22 located at a rear position within the head case 8. A coil spring 23 surrounds a rear end portion of each of the printing elements 12 and extends between the movable end 20 of the corresponding armature 16 and a rear one of the guide plates 14 so that the movable end 20 of the armature 16 is normally pressed against the stopper 22.

An electric circuit 24 is provided for applying a negative voltage to the opposing electrode 7 with the print head 6 grounded. The print head 6 and the opposing electrode 7 are treated for insulation in prior.

With such a construction as described above, printing is effected with the printing elements 12 held clear of the record paper 3. In particular, the tapered ends of the printing elements 12 are wetted with ink 9 which comes around thereto through gaps between the printing elements 12 and the fitting holes 11 from within the ink tank 10 and is held thereto by surface tension. Here, if the driving device 13 is operated to advance one of the print elements 12, the gap G between the printing element 12 and the opposing electrode 7 is reduced to a gap N. As a result, the ink 9 around the tapered end of the printing element 12 is attracted to fly toward the opposing electrode 7 due to a Coulomb's force thereby to form a dot of the ink 9 on the record paper 3. A symbol is thus printed by a selective collection of such dots.

More particularly, if a magnetic coil 15 is energized, it is magnetized to attract the corresponding armature 16 so that the latter is pivoted around the support end 17 thereof whereupon the movable end 20 thereof operates the rear end of the corresponding printing element 12. As a result, the printing element 12 is pushed to move forwardly. Then, if the magnetic coil 15 is deenergized, the printing element 12 is returned to its original position by a force of the corresponding coil spring 23. In the meantime, by the reciprocating movement of the printing element 12, the magnitude of the gap between the tapered end of the printing element 12 and the opposing electrode 7 is varied between the gap G and the gap N. Here, when the gap is G, an adhering force of the ink 9 to the printing element 12 is greater than a Coulomb's force to attract the ink 9 toward the opposing electrode 7, and hence the ink 9 is not caused to fly. On the contrary, when the gap is N, the ink 9 is acted upon by a Coulomb's force sufficient to cause the ink 9 to fly, and as a result, the ink 9 is flown to form a dot on the record paper 3.

Meanwhile, it is widely known that where there is a potential difference between two bodies, spark discharging will appear less readily as the negative electrode becomes more flat. Therefore, in the present embodiment, a potential difference is caused to appear between the opposing electrode 7 and the printing elements 12 with the opposing electrode 7 in the form of a flat band serving as a negative electrode. As a result, a critical voltage causing a spark discharge rises, thereby allowing a potential difference between the two members to be increased to assure effective flying of the ink 9 and prevent appearance of a spark discharge. Accordingly, such troubles as damage to the printing elements 12 or extraordinary scattering of the ink 9 which are brought about by appearance of a spark discharge can be resolved at a time.

In addition, as for treatment for insulation, insulation treatment of the opposing electrode 7 is easy because it is simple in shape and structure, while on the other hand, insulation treatment of the print head 6 is not required particularly because it is treated for insulation in prior due to presence of the magnetic coils 15 thereon. While it is known that insulation of the negative electrode will be more effective for prevention of appearance of a spark discharge, here is a new significance that the opposing electrode 7 which can be easily treated for insulation serves as a negative electrode.

It is to be noted that when the present invention is put into practice, the printing elements 12 may otherwise be fixed in position and a potential difference as a recording signal which is sufficient to cause ink 9 around a tapered end of a printing element 12 to fly may normally be caused to appear selectively between the printing elements 12 and the opposing electrode 7.

As apparent from the foregoing description, according to the present invention, a print head having printing elements thereon is grounded while a negative voltage is applied to an opposing electrode disposed in an opposing relationship to the printing elements to provide between the printing elements and the opposing electrode a potential difference sufficient to cause ink adhering to ends of the printing elements to fly. Accordingly, a critical point causing appearance of a spark discharge is raised, and hence appearance of a spark discharge can be prevented effectively. Therefore, an ink dot printer according to the present invention presents an effect that damage to the printing elements and extraordinary scattering of ink can be eliminated, and hence stabilized printing can be assured with a device of high safety.

What is claimed is:

1. An ink dot printer comprising a print head including a plurality of printing elements having ends to which ink is adhered, and an opposing electrode disposed in an opposing relationship to the ends of said printing elements with record paper interposed therebetween, whereby a negative voltage is applied to said opposing electrode while said print head is grounded to provide between said opposing electrode and said printing elements a potential difference sufficient to cause the ink to fly toward said opposing electrode.

2. An ink dot printer according to claim 1, wherein the potential difference to be provided between said print head and said opposing electrode corresponds to a printing signal.

3. An ink dot printer according to claim 1, wherein a voltage applied between said printing elements and said opposing electrode is maintained constant, and said printing elements are selectively moved toward said opposing electrode in response to a printing signal.

4. An ink dot printer according to claim 3, wherein each of said printing elements is formed as a needle.

5. An ink dot printer according to claim 4, wherein each of said printing elements is coupled to an armature which is disposed to be operated by a magnetic coil.

6. An ink dot printer on a record paper, said printer comprising:

a printhead including a plurality of printing elements formed as needles which are selectively movable toward and away from said paper in response to a printing signal, having pointed end nearest said paper, driving means for moving said printing elements including an armature operated by a magnetic coil and a source of ink in communication with said printing elements for causing ink to adhere to the pointed ends of said printing elements;

an opposing electrode having a flat surface adjacent said paper and facing the pointed ends of said printing elements;

a source of potential providing a constant potential difference between said printhead and said electrode;

said potential difference causing said adhered ink to be attracted to said electrode and forming an ink dot on said paper only when said printing elements are driven toward said paper by said driving means;

means for preventing a spark discharge including a negative terminal of said source of potential being connected to said electrode and a grounded terminal of said source of potential being connected to said printhead so that spark discharges are suppressed due to the flatness of the electrode.

* * * * *